US010104316B2

(12) United States Patent
Seki

(10) Patent No.: US 10,104,316 B2
(45) Date of Patent: Oct. 16, 2018

(54) INFORMATION PROCESSING DEVICE AND INFORMATION PROCESSING METHOD

(71) Applicant: Sony Corporation, Tokyo (JP)

(72) Inventor: Kenzaburo Seki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/125,691

(22) PCT Filed: Feb. 27, 2015

(86) PCT No.: PCT/JP2015/055801
§ 371 (c)(1),
(2) Date: Sep. 13, 2016

(87) PCT Pub. No.: WO2015/170503
PCT Pub. Date: Nov. 12, 2015

(65) Prior Publication Data
US 2017/0006238 A1    Jan. 5, 2017

(30) Foreign Application Priority Data

May 8, 2014  (JP) ................................ 2014-096867

(51) Int. Cl.
*H04N 5/341*         (2011.01)
*H04N 5/232*         (2006.01)
(Continued)

(52) U.S. Cl.
CPC ......... *H04N 5/341* (2013.01); *H04N 5/23293* (2013.01); *H04N 5/3532* (2013.01);
(Continued)

(58) Field of Classification Search
CPC .... H04N 5/341; H04N 5/23293; H04N 5/374; H04N 5/3532; H04N 5/3742; H04N 5/37452; H04N 5/378; H04N 5/3765
(Continued)

(56) References Cited

U.S. PATENT DOCUMENTS 6,963,374 B2 * 11/2005 Nakamura ............. H04N 1/212
                                              348/220.1
8,446,484 B2 *  5/2013 Muukki ............. H04N 5/23293
                                              348/222.1
(Continued)

FOREIGN PATENT DOCUMENTS

JP         2013-055589 A      3/2013

*Primary Examiner* — Pritham Prabhakher
(74) *Attorney, Agent, or Firm* — Michael Best & Friedrich LLP

(57) ABSTRACT

[Object] To provide an information processing device and an information processing method that can further shorten a time taken to perform processes related to an output of a captured image.
[Solution] Provided is an information processing device including a processing unit configured to process each piece of first data transferred with a first data density and second data transferred with a second data density that is different from the first data density based on pixel signals output from each of a plurality of pixels. The processing unit executes at least one of processing of outputting an image based on the first data and image-processing on the second data based on the first data.

14 Claims, 10 Drawing Sheets

(51) Int. Cl.
*H04N 5/374* (2011.01)
*H04N 5/376* (2011.01)
*H04N 5/353* (2011.01)
*H04N 5/378* (2011.01)
*H04N 5/3745* (2011.01)

(52) U.S. Cl.
CPC ............. *H04N 5/374* (2013.01); *H04N 5/378* (2013.01); *H04N 5/3742* (2013.01); *H04N 5/3765* (2013.01); *H04N 5/37452* (2013.01)

(58) Field of Classification Search
USPC ...................................................... 348/222.1
See application file for complete search history.

(56) References Cited

U.S. PATENT DOCUMENTS

| | | | | |
|---|---|---|---|---|
| 8,830,367 | B1 * | 9/2014 | Mobbs | H04N 5/2329 348/218.1 |
| 9,124,794 | B2 * | 9/2015 | Choe | H04N 5/232 |
| 9,154,700 | B2 * | 10/2015 | Yoon | H04N 1/0044 |
| 9,363,440 | B2 * | 6/2016 | Nakazono | H04N 5/23293 |
| 2011/0019936 | A1 * | 1/2011 | Bhrugumalla | H04N 5/232 382/298 |
| 2011/0090366 | A1 * | 4/2011 | Yoon | H04N 1/0044 348/231.2 |
| 2011/0261217 | A1 * | 10/2011 | Muukki | G06T 3/4015 348/222.1 |
| 2011/0261228 | A1 * | 10/2011 | Peng | H04N 1/2145 348/231.6 |
| 2012/0033103 | A1 * | 2/2012 | Corey | H04N 5/23245 348/231.6 |
| 2012/0050575 | A1 * | 3/2012 | Choe | H04N 5/232 348/231.99 |
| 2012/0112040 | A1 * | 5/2012 | Cho | H04N 5/3742 250/208.1 |
| 2012/0287294 | A1 * | 11/2012 | Kaizu | H04N 5/2355 348/208.4 |
| 2013/0113971 | A1 * | 5/2013 | Okada | H04N 5/3742 348/308 |
| 2013/0222671 | A1 * | 8/2013 | Tseng | H04N 5/23216 348/333.11 |
| 2014/0118588 | A1 * | 5/2014 | Puetter | H04N 5/347 348/300 |

\* cited by examiner

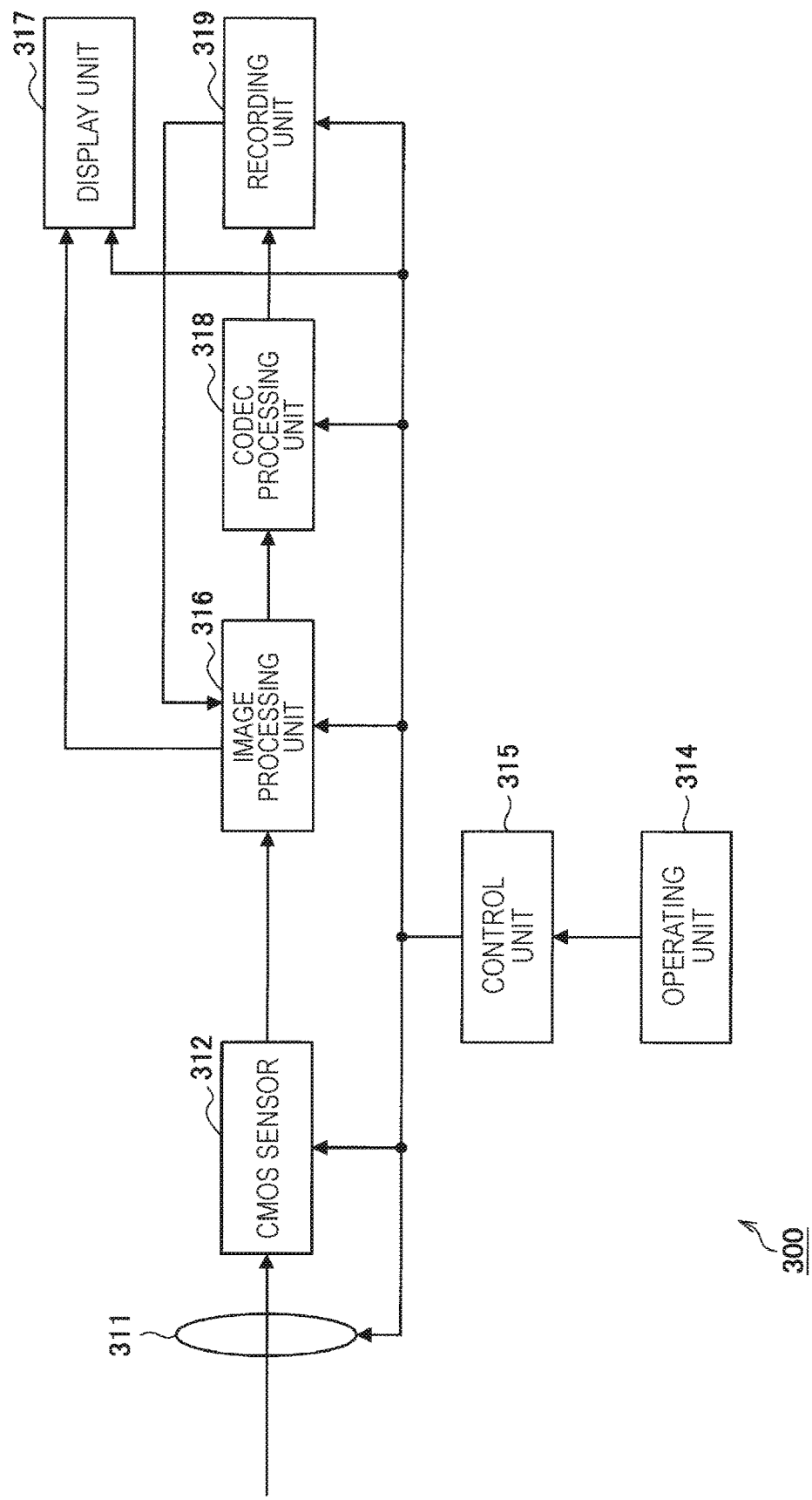

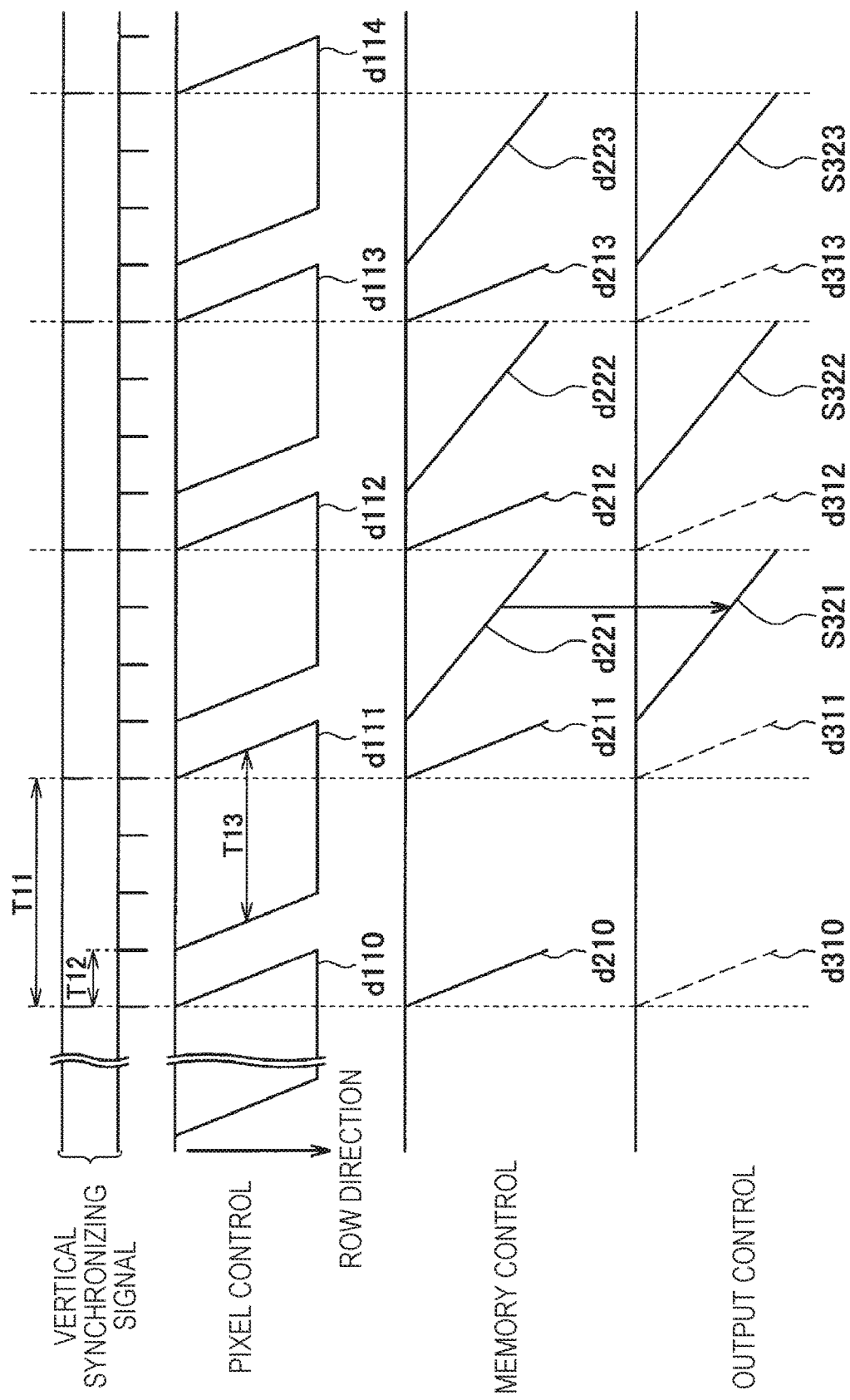

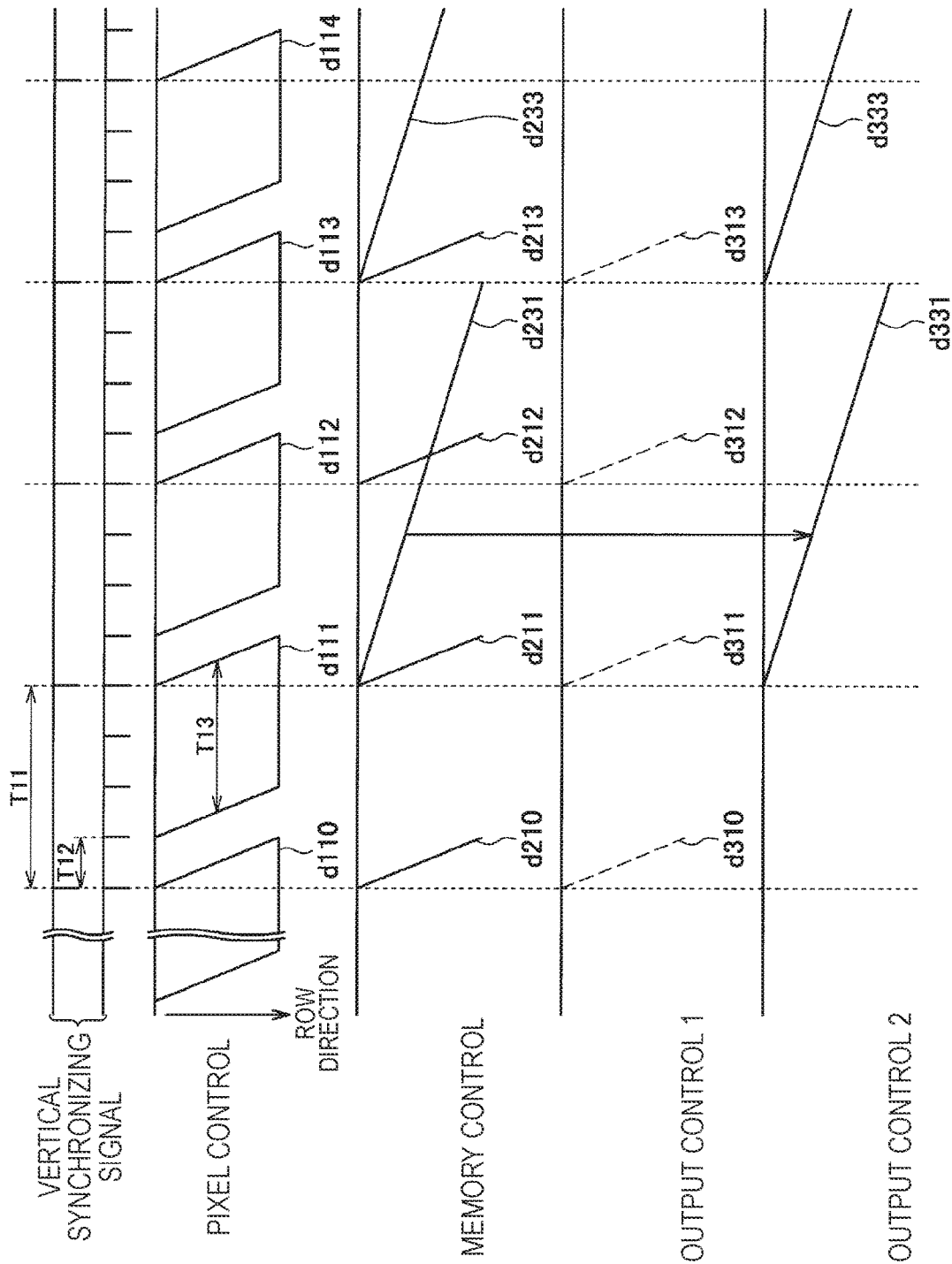

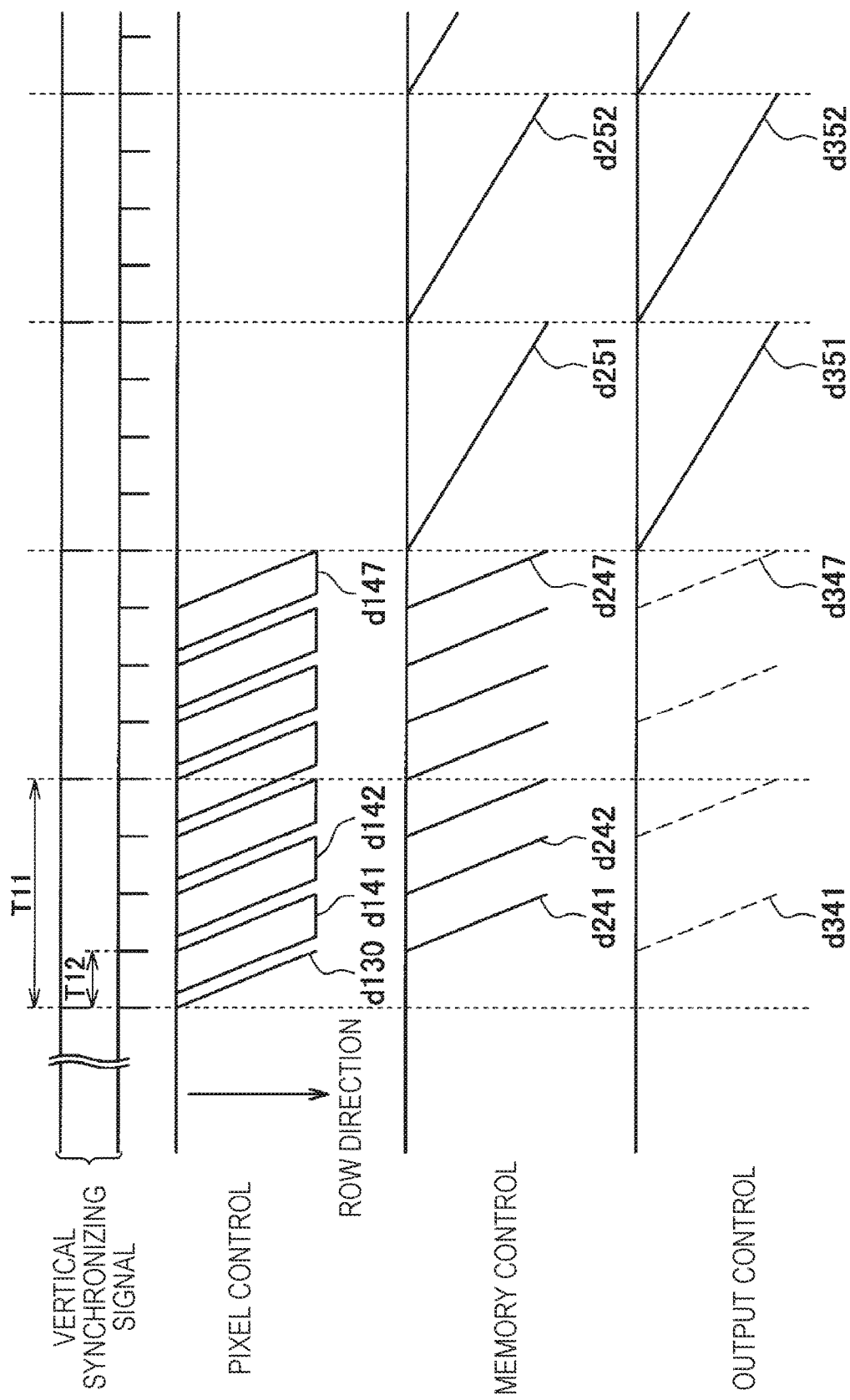

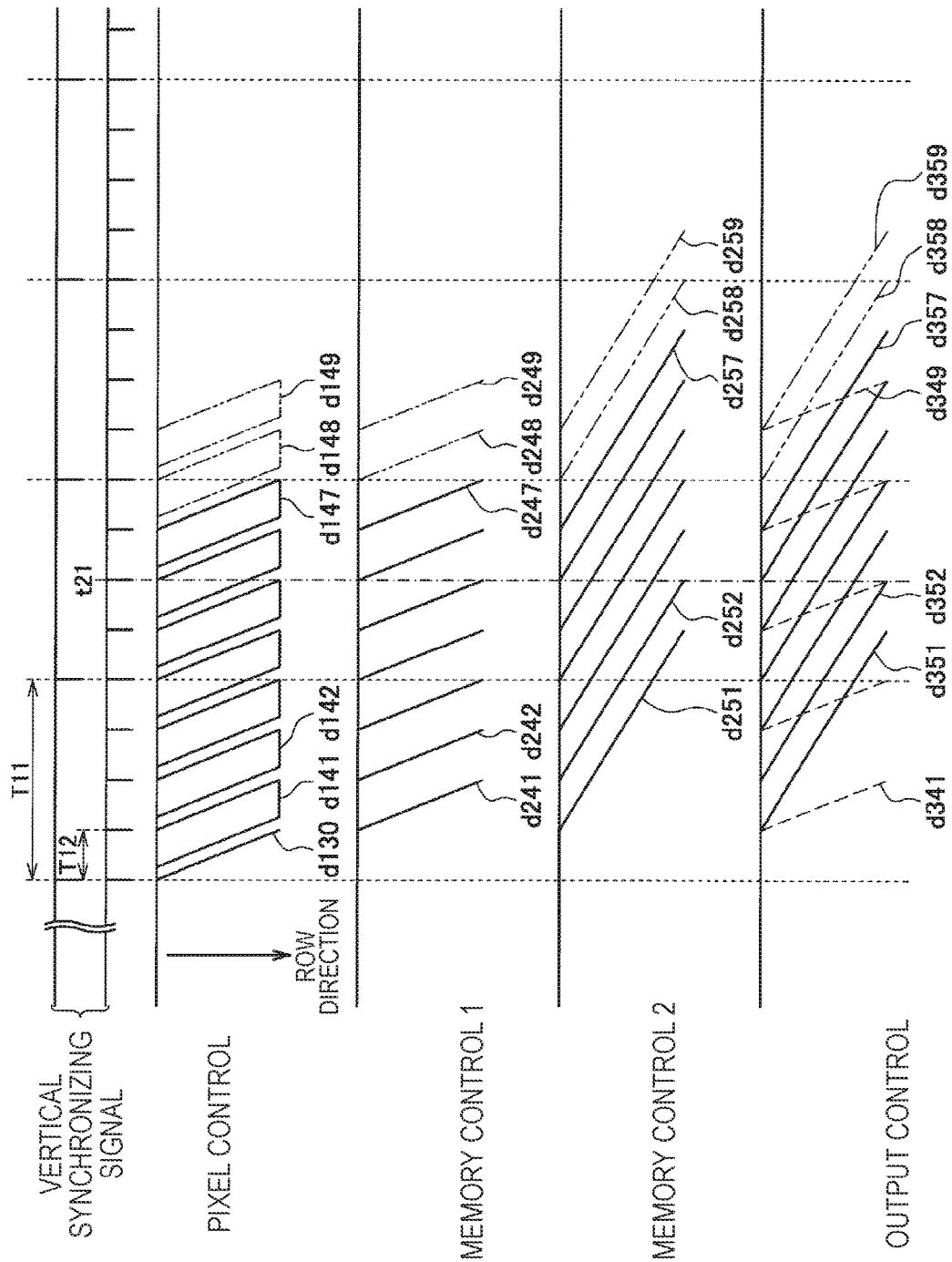

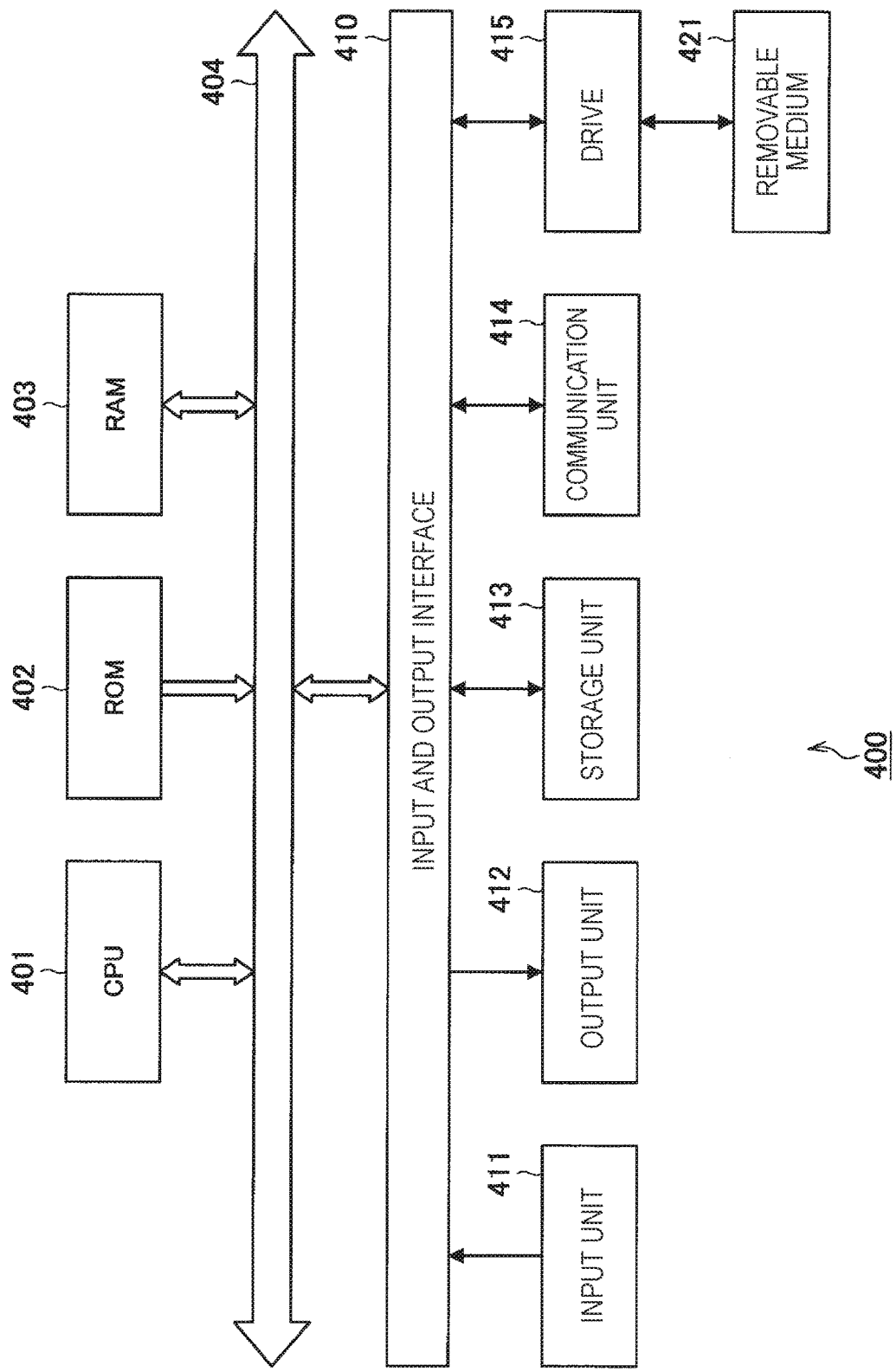

INFORMATION PROCESSING DEVICE AND INFORMATION PROCESSING METHOD

TECHNICAL FIELD

The present disclosure relates to an information processing device and an information processing method.

BACKGROUND ART

In recent years, digital still cameras and digital video cameras equipped with image sensors such as charge coupled device (CCD) or complementary metal-oxide semiconductor (CMOS) sensors have become widespread. Digital still cameras capture still images, and digital video cameras capture dynamic images; however, there are digital still cameras which can capture dynamic images and digital video cameras which can capture still images. Note that when it is not necessary to distinguish a digital still camera and a digital video camera hereinbelow, each may be referred to simply as a digital camera.

Such a digital camera described above includes a display unit configured as, for example, a liquid crystal display (LCD), and is configured to display captured images on such display units in most cases. In addition, recently, some of the digital cameras described above automatically perform image processing on a captured image, such as detecting a region of the face of a person from a captured image and adjusting hue of a detected region.

CITATION LIST

Patent Literature

Patent Literature 1: JP 2013-055589A

SUMMARY OF INVENTION

Technical Problem

In addition, some recent digital cameras can capture images with higher resolution (high resolution images) by increasing the number of pixels of an image sensor. With regard to this, the amount of data of an image tends to increase as it has higher resolution. Thus, there are cases in which time taken to perform processes related to an output of a captured image, e.g., processes of causing a captured image to be displayed on a display unit for checking by a user, analyzing the captured image, performing image processing on the image, and outputting the image, increases as well.

Therefore, the present disclosure proposes a novel and improved information processing device and information processing method that can further shorten a time taken to perform processes related to an output of a captured image.

Solution to Problem

According to the present disclosure, there is provided an information processing device including a processing unit configured to process each piece of first data transferred with a first data density and second data transferred with a second data density that is different from the first data density based on pixel signals output from each of a plurality of pixels. The processing unit executes at least one of processing of outputting an image based on the first data and image-processing on the second data based on the first data.

According to the present disclosure, there is provided an information processing device including a holding unit configured to hold data based on pixel signals output from each of a plurality of pixels, and an output unit configured to output each piece of first data based on pixel signals output from at least some pixels among the plurality of pixels and second data based on the pixel signals held in the holding unit to a processing unit configured to execute at least one of processes of processing an image based on the first data and processing an image based on the second data which is performed based on the first data.

According to the present disclosure, there is provided an information processing method including processing each piece of first data transferred with a first data density and second data transferred with a second data density that is different from the first data density, and executing at least one of processing of outputting an image based on the acquired first data and image-processing on the second data based on the first data.

ADVANTAGEOUS EFFECTS OF INVENTION

According to the present disclosure described above, an information processing device and an information processing method which can further shorten a time taken to perform processes related to an output of a captured image are provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7 is a block diagram illustrating an example of a configuration of the imaging device according to the embodiment.

FIG. 8 is a schematic time chart for describing an example of a flow of a process of an imaging device according to example 1.

FIG. 9 is a schematic time chart for describing an example of a flow of a process of an imaging device according to example 2.

FIG. 10 is a schematic time chart for describing an example of a flow of a process of an imaging device according to example 3.

FIG. 11 is a schematic time chart for describing another example of a flow of a process of the imaging device according to the example.

FIG. 12 is an illustrative diagram for describing an example of a hardware configuration of a computer according to the embodiment.

DESCRIPTION OF EMBODIMENT(S)

Figure 1:
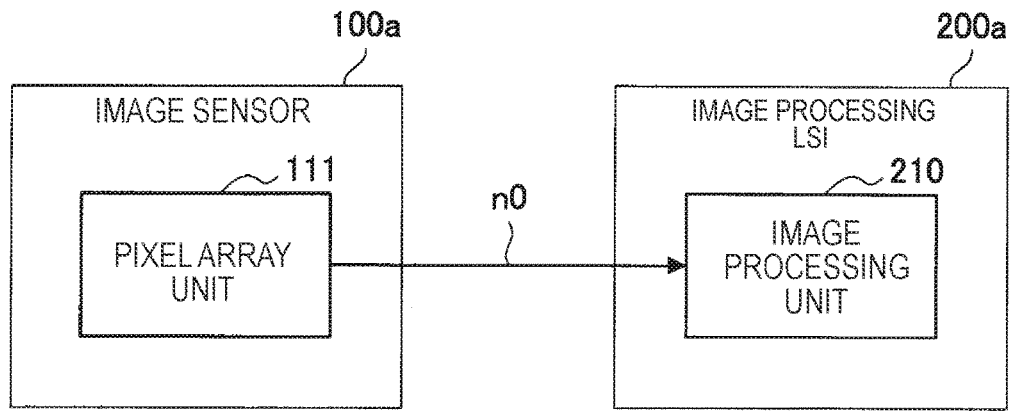
FIG. 1 is an illustrative diagram for describing an example of a schematic configuration of an imaging device according to a comparative example.

Hereinafter, preferred embodiments of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.

1. Embodiment
1.1. Summary of Problem
1.2. Overview
1.3. Configuration of Image Sensor
1.4. Configuration of Imaging Device
2. Example
2.1. Example 1: Example in which Images with Different Resolutions are Output in Time Series Manner
2.2. Example 2: Example in which Images with Different Resolutions are Output in Parallel
2.3. Example 3: Example in which Consecutive Photographing is Performed
3. Hardware Configuration
4. Conclusion
1. <Embodiment>
[1.1. Summary of Problem]

Figure 2:
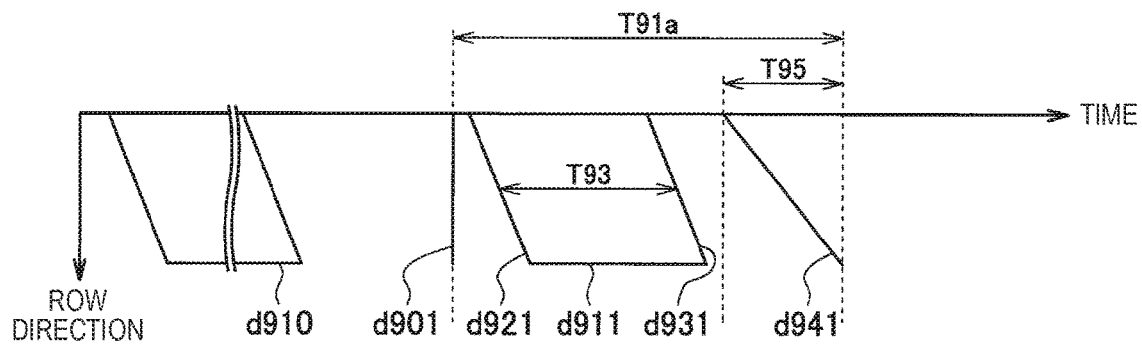
FIG. 2 is an illustrative diagram for describing a flow of a process of an imaging device according to comparative example 2.
Figure 3:
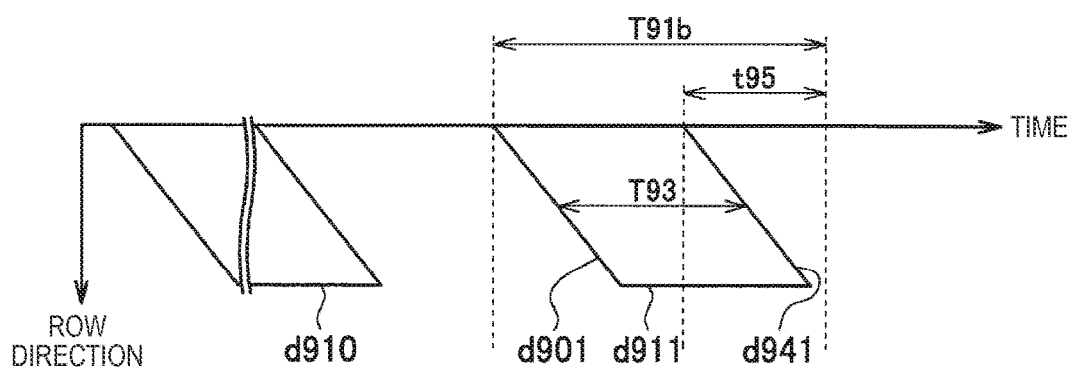
FIG. 3 is an illustrative diagram for describing a flow of a process of an imaging device according to comparative example 3.

Before describing an imaging device according to an embodiment of the present disclosure, a problem of the imaging device according to the present embodiment will be summarized by describing examples of imaging devices of the related art in comparative examples with reference to FIGS. 1 to 3. First, an overview of an imaging device according to a comparative example will be described with reference to FIG. 1. FIG. 1 is an illustrative diagram for describing an example of a schematic configuration of the imaging device according to the comparative example. Note that the example illustrated in FIG. 1 may be referred to as comparative example 1 below.

In FIG. 1, reference numeral 100*a* schematically represents an image sensor provided in the imaging device according to comparative example 1. The image sensor 100*a* is an image sensor which captures a subject and then obtains digital data of the captured image, for example, a complementary metal-oxide semiconductor (CMOS) image sensor or a charge coupled device (CCD) image sensor. The image sensor 100*a* is configured to include a pixel array unit 111 in which a plurality of pixels are arranged in a matrix (an array) shape. Note that although a circuit other than the pixel array unit 111 can also be generally included, illustration of the circuit other than the pixel array unit 111 is omitted in the example illustrated in FIG. 1 to facilitate understanding of the description.

In addition, reference numeral 200*a* schematically represents an image processing large scale integration (LSI) which performs so-called image processing on image signals supplied based on pixel signals from the pixels of the pixel array unit 111. As examples of image processing, for example, black level correction, color mixture correction, defect correction, demosaic processing, matrix processing, gamma correction, YC conversion, and the like are exemplified. An image processing unit 210 schematically represents the image processing functions realized by the image processing LSI 200*a*. Note that although the image processing LSI 200*a* may include a configuration for executing functions other than image processing, configurations other than the image processing unit 210 are not illustrated in the example illustrated in FIG. 1 to facilitate understanding of the description.

In addition, reference numeral n0 schematically represents a flow (a stream) of signals transferred between the image sensor 100*a* and the image processing LSI 200*a*.

That is, in the imaging device according to comparative example 1 illustrated in FIG. 1, the image sensor 100*a* photoelectrically converts light incident via optical system elements that are not illustrated, performs an A-D conversion on values of respective pixels, and thereby generates image signals indicting a captured image of a subject. Then, the image sensor 100*a* outputs the generated image signals to the image processing unit 210 of the image processing LSI 200*a* as the stream n0.

The image processing LSI 200*a* acquires the image signals output from the image sensor 100*a* as the stream n0, performs image processing on the acquired image signals, and causes the image signals that has undergone the image processing to be displayed on a display unit which is not illustrated as, for example, a preview image (a so-called through image). Accordingly, a user can check the captured image through the display unit.

Next, an example of a flow of a process performed by the imaging device illustrated in FIG. 1 in which the image sensor 100*a* exposes an image of a subject to light (performs capturing) and the image processing LSI 200*a* reads image signals indicating the light-exposed image will be described with reference to FIG. 2. FIG. 2 is an illustrative diagram for describing the flow of the process of the imaging device according to another comparative example and shows an example of a schematic time chart when a so-called focal-plane shutter that uses mechanical front and rear curtains is applied. Note that the case illustrated in FIG. 2 may be referred to as comparative example 2 below.

In FIG. 2, the horizontal axis represents time, and the vertical axis represents a row direction of the pixel array unit 111. In addition, reference numerals d910 and d911 schematically indicate exposure periods of pixels of the pixel array unit 111. Note that the exposure period indicated by the reference numeral d910 is assumed to represent an exposure period of an image captured before the exposure period indicated by the reference numeral d911.

Here, a flow of a series of processes performed when an image of a subject is captured will be described focusing on the exposure period d11. First, pixel signals accumulated in all pixels are reset at a timing indicated by reference numeral d901. When the reset of all of the pixels is completed, the front curtain blocking incidence of light on the pixels moves in the row direction, the light blocked by the front curtain is accordingly incident on the pixels, and thereby exposure is started as indicated by reference numeral d921. Then, as the rear curtain moves in the row direction to follow the preceding front curtain, the rear curtain blocks the incidence of light on the pixels, and thereby exposure ends, as indicated by reference numeral d931. That is, with regard to the pixels, a period T93 indicated between the reference numerals d921 and d931 corresponds to an exposure time of the pixels, and exposure start and end timings of the pixels are different in units of rows in the example illustrated in FIG. 2.

In addition, reference numeral d941 in FIG. 2 schematically indicates a process of reading pixel signals from each of the pixels. That is, in comparative example 2 illustrated in FIG. 2, after an exposure of a series of pixels is completed, pixel signals are sequentially read from each of the pixels in units of rows. Reference numeral T95 indicates a period of the process of reading the pixel signals from the series of pixels.

That is, in the case of comparative example 2 illustrated in FIG. 2, after the exposure of the series of pixels is completed and the pixel signals are read from the series of pixels, a captured image is generated. In other words, in the case of comparative example 2 illustrated in FIG. 2, during a period T91a from the reset of all of the pixels to the completion of the reading of the image signals from the series of pixels, it is difficult to output an image captured in the exposure period d911.

Note that it is possible to display an image captured in the exposure period d910 during the period T91a. However, when a previously captured image, for example, the image, is displayed as a monitoring image, a subject image that is earlier than the subject that a user is practically viewing is output. A real-time feature is lacking.

Next, another example of a flow of a process performed by the imaging device illustrated in FIG. 1 in which the image sensor 100a exposes an image of a subject to light (performs capturing) and the image processing LSI 200a reads image signals indicating the light-exposed image will be described with reference to FIG. 3. FIG. 2 is an illustrative diagram for describing the flow of the process of the imaging device according to another comparative example and shows an example of a schematic time chart when exposure periods of pixels are electronically controlled without using mechanical front and rear curtains. Note that the example illustrated in FIG. 3 may be referred to as comparative example 3 below.

In FIG. 3, the horizontal axis represents time, and the vertical axis represents the row direction of the pixel array unit 111. In addition, reference numerals d910 and d911 schematically indicate exposure periods of the pixels of the pixel array unit 111 as in FIG. 2. The exposure period indicated by the reference numeral d910 is assumed to represent an exposure time of an image captured before the exposure time indicated by the reference numeral d911.

In comparative example 3 illustrated in FIG. 3, a reset of pixel signals accumulated in the pixels is synchronized with a start of exposure of the pixels. That is, when the reset of the pixels is sequentially executed in units of rows and then the reset of the pixels is completed, the exposure of the pixels is quickly started as indicated by the reference numeral d901. In addition, an end of the exposure of the pixels is synchronized with reading of pixel signals from the pixels. That is, when exposure of the pixels ends, the reading of pixel signals from the pixels is quickly started as indicated by reference numeral d941.

With this configuration, it is possible to start the reading of the pixel signals from the pixels without waiting for the completion of the exposure of all of the pixels in comparative example 3 illustrated in FIG. 3. Thus, it is possible to shorten a period T91b from the start of the exposure to the completion of the reading of the pixel signals from the series of pixels in comparative example 3 illustrated in FIG. 3 more in comparison to comparative example 2 illustrated in FIG. 2.

On the other hand, in comparative example 3 illustrated in FIG. 3, a speed of scanning each of the pixels depends on a speed of reading of image signals from the pixels which is indicated by the reference numeral d941. Thus, when a speed of a transfer of the stream n0 illustrated in FIG. 1 is limited, for example, the speed of scanning becomes slow as a resolution of a captured image increases, and there is a case in which focal plane distortion, for example, occurs. Note that, as an example in which a speed of a transfer of the stream n0 is limited, a case in which a band of a bus between the image sensor 100a and the image processing LSI 200a is limited is exemplified.

In addition, when image processing is performed on a captured image in both comparative examples 2 and 3 described above, after the reading of the pixel signals from the series of pixels is completed and the image is analyzed based on the pixel signals, image processing is performed based on the result of the analysis. Thus, in comparative examples 2 and 3, as the resolution of the captured image increases, a time taken for processes including the processes from the exposure to the reading of the pixel signals and analyzing the image based on the pixel signals increases, and a time necessary for outputting the image increases as a result.

Therefore, the imaging device according to the present embodiment aims to further shorten a time taken for processes related to an output of a captured image such as processes of causing a captured image to be displayed on the display unit for checking by a user and analyzing the captured image, performing image processing on the image, and outputting the image.

[1.2. Overview]

Figure 4:
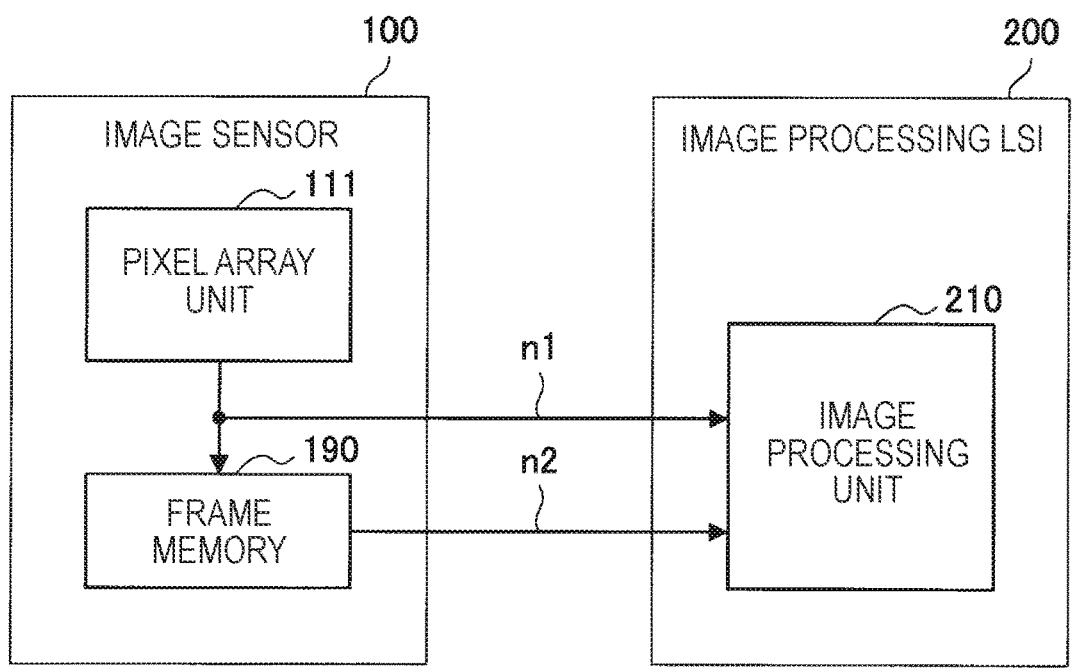
FIG. 4 is an illustrative diagram for describing an overview of an imaging device according to an embodiment of the present disclosure.

Next, an overview of the imaging device according to the present embodiment will be described with reference to FIG. 4. FIG. 4 is an illustrative diagram for describing the overview of the imaging device according to the embodiment of the present disclosure. Note that FIG. 4 illustrates a schematic configuration of the imaging device according to the present embodiment focusing on an image sensor 100 and an image processing LSI 200, and other configurations thereof are not illustrated.

As illustrated in FIG. 4, the image sensor 100 according to the embodiment is different from the image sensor 100a according to comparative example 1 illustrated in FIG. 1 in that the former includes a frame memory 190. Reference numerals n1 and n2 schematically indicate flows (streams) of signals between the image sensor 100 and the image processing LSI 200.

In addition, the imaging device according to the present embodiment electronically controls exposure periods of pixels without using mechanical front and rear curtains, as in comparative example 3 described based on FIG. 3. Thus, the imaging device according to the present embodiment is configured to be capable of sequentially reading pixel signals from pixels for which exposure has been completed, without waiting for completion of exposure for all of the pixels.

Specifically, in the imaging device according to the present embodiment illustrated in FIG. 4, the image sensor 100 performs a photoelectric conversion on light incident via optical system elements that are not illustrated, performs an A-D conversion on pixel values of the pixels, and thereby generates image signals indicating a captured image of a subject. At this time, the image sensor 100 outputs image signals based on pixel signals from at least some pixels among a plurality of pixels constituting the pixel array unit 111 to the image processing LSI 200 as the stream n1.

In addition, the image sensor 100 temporarily records the pixel signals from the plurality of pixels constituting the pixel array unit 111 in the frame memory 190. Then, the image sensor 100 sequentially reads the pixel signals of the pixels recorded in the frame memory 190, and outputs image signals based on the read pixel signals to the image processing LSI 200 as the stream n2.

With this configuration, the image sensor 100 can output a low resolution image (i.e., a thinned image) based on the pixel signals from some of the pixels as the stream n1 and a high resolution image based on the pixel signals from all of the pixels as the stream n2 to the image processing LSI 200.

Note that since the image sensor 100 can temporarily store the pixel signals from all of the pixels in the frame memory 190, it is not necessary to output the stream n1 and the stream n2 to the image processing LSI 200 at the same timing in parallel. That is, the image sensor 100 can output the stream n2 after outputting the stream n1. Of course, it is needless to say that the image sensor 100 may output the stream n1 and the stream n2 to the image processing LSI 200 in parallel.

Thus, the image processing LSI 200 also can, for example, causes the image signals output first from the image sensor 100 as the stream n1 (the low resolution image) to be displayed on the display unit as a preview image, and can record the image signals output as the stream n2 (the high resolution image) as image data. With this configuration, the imaging device according to the present embodiment can shorten a time taken from the completion of exposure to the display of the preview image (in other words, the time during which no screen is displayed after the imaging of the image) more even when a speed of a transfer between the image sensor 100 and the image processing LSI 200 is limited than in each comparative example described above.

In addition, as another example, the image processing LSI 200 can also analyze the image signals output first from the image sensor 100 as the stream n1 (the low resolution image), and perform image processing on the image signals output as the stream n2 (the high resolution image) based on the result of the analysis.

That is, the image processing LSI 200 can execute the analysis of the image signals output as the stream n1 and the acquisition of the image signals output as the stream n2 in parallel. In addition, since the image signals of the low resolution image are acquired as the stream n1, both a time taken for acquisition of the image signals to be analyzed and a time taken for their analysis can be shortened more than when the image signals of all of the pixels are analyzed. Thus, the imaging device according to the present embodiment can shorten a time taken from the completion of the exposure to the analysis of the captured image, image processing on the captured image based on the result of the analysis, and the output of the processed image.

Furthermore, since the image processing LSI 200 can acquire the streams n1 and n2 in a time division manner in the configuration described above, image signals of an image captured in the same frame can be used as the streams n1 and n2. Thus, the imaging device according to the present embodiment can improve accuracy in image processing more than when image processing is performed based on a result of analysis on signals of images captured in different frames.

In addition, as still another example, the image processing LSI 200 may sequentially acquire the image signals of a low resolution image as the stream n1 from the image sensor 100 and generate a dynamic image based on the acquired image. In addition, at this time, the image processing LSI 200 may acquire the image signals of a high resolution image corresponding to a desired frame (for example, a frame designated by a user) as the stream n2 and generate a still image based on the acquired image signals.

With this configuration, the imaging device according to the present embodiment can capture both a dynamic image and a still image at the same time and record an image with a higher resolution than the dynamic image as the still image. In addition, at this time, the image sensor 100 outputs the image signals of the high resolution image only of the desired frame. Thus, the imaging device according to the present embodiment can suppress a volume of the image signals transferred between the image sensor 100 and the image processing LSI 200 to a minimum level, and can also shorten a time necessary for outputting each image.

Note that it is not necessary to provide the image sensor 100 and the image processing LSI 200 in the same housing. In such a case, a device provided with the image processing LSI 200 corresponds to an example of an "information processing device." In addition, the stream n1 corresponds to an example of "first data" transmitted with "first data density," and the stream n2 corresponds to an example of "second data" transmitted with "second data density." Furthermore, a configuration of the image processing unit 210 for acquiring the streams n1 and n2 corresponds to an example of an "acquisition unit," and a configuration thereof for outputting each image based on the streams n1 and n2 (for example, a preview image or an image that has undergone image processing) corresponds to an example of a "processing unit."

The overview of the imaging device according to the present embodiment has been described above with reference to FIG. 4. Next, the imaging device according to the present embodiment will be described more below.

[1.3. Configuration of Image Sensor]

Figure 5:
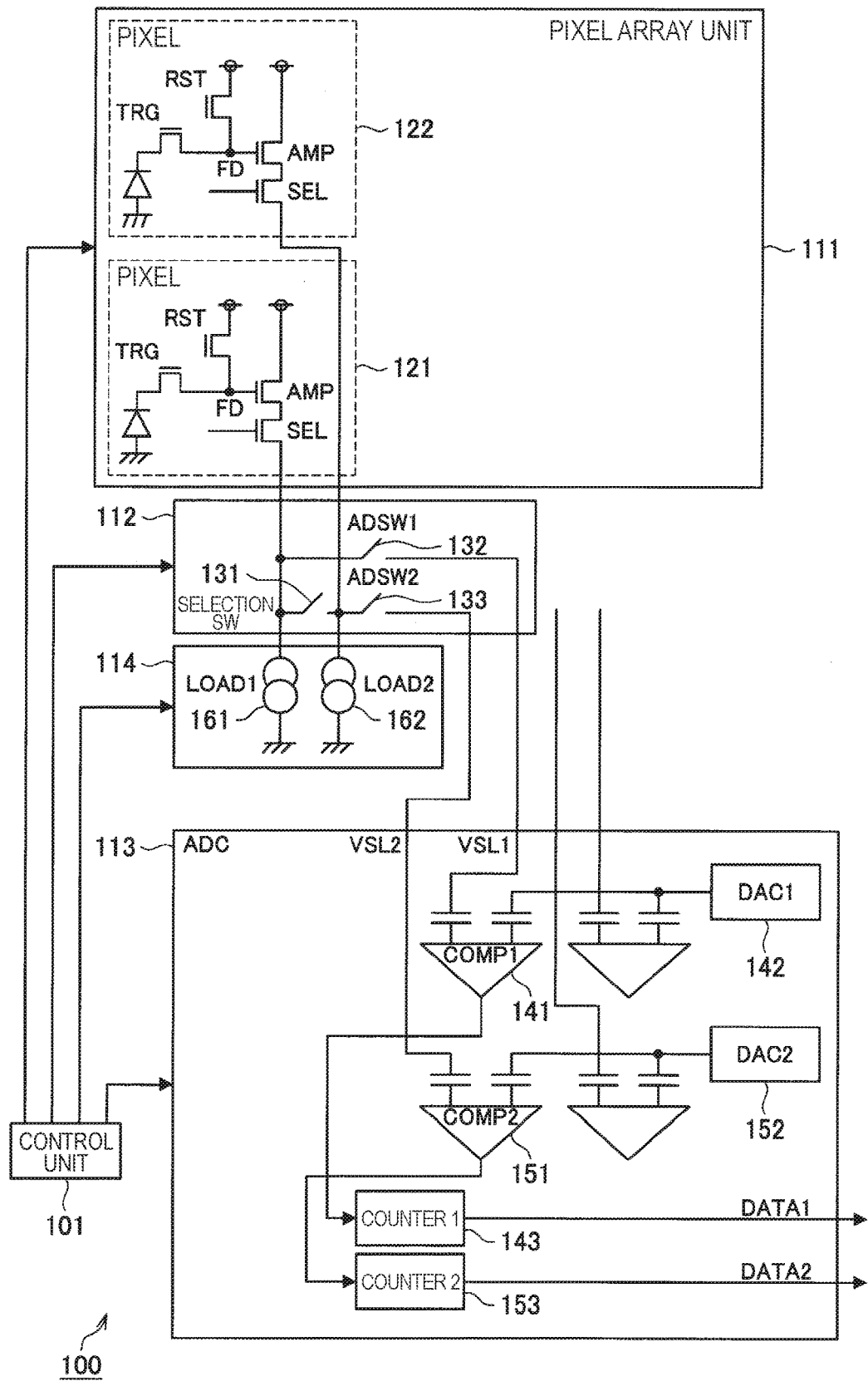
FIG. 5 is a block diagram illustrating an example of a configuration of a part of an image sensor according to the embodiment.

First, an example of a configuration of the image sensor according to the present embodiment will be described with reference to FIG. 5, particularly focusing on a configuration in which light incident via optical system elements, which are not illustrated, is photoelectrically converted and then pixel values of respective pixels undergo an A-D conversion, and thereby pixel signals are generated and output. FIG. 5 is a block diagram illustrating an example of a partial configuration of the image sensor according to the present embodiment. The image sensor 100 illustrated in FIG. 5 is an image sensor which captures a subject and then obtains digital data of the captured image, for example, a complementary metal-oxide semiconductor (CMOS) image sensor or a charge coupled device (CCD) image sensor.

As illustrated in FIG. 5, the image sensor 100 has a control unit 101, the pixel array unit 111, a selection unit 112, an A-D converter (an analog-digital converter (ADC)) 113, and a constant current circuit unit 114.

The control unit 101 controls each of the units of the image sensor 100 to execute processes related to reading of image data (pixel signals) and the like.

The pixel array unit 111 is a pixel region in which pixel configurations having photoelectric transducers such as photodiodes are arranged in a matrix (an array) shape. The pixel array unit 111 is controlled by the control unit 101, receives light of a subject using the pixels, photoelectrically converts the incident light and accumulates electric charge, and outputs the electric charge accumulated in the pixels at a predetermined timing as pixel signals.

A pixel 121 and a pixel 122 represent two pixels adjacent to each other in a vertical direction among a group of pixels arranged in the pixel array unit 111. The pixel 121 and the pixel 122 are pixels in consecutive rows in the same column.

In the example of FIG. 5, photoelectric transducers and four transistors are used for a circuit of each pixel as illustrated in the pixel 121 and the pixel 122. Note that a configuration of the circuit of each pixel is arbitrary, and an example other than that illustrated in FIG. 5 may be adopted.

A general pixel array is provided with output lines of pixel signals in each column. In a case of the pixel array unit 111, 2 (2-series) output lines are provided in one column. Circuits of pixels in one column are connected to two output lines in every other row. For example, circuits of pixels in odd-numbered rows from the top are connected to one output line, and circuits of pixels in even-numbered rows are connected to the other output line. In the example of FIG. 5, the circuit of the pixel 121 is connected to the first output line (VSL1), and the circuit of the pixel 122 is connected to the second output line (VSL2).

Note that, although only the output lines for one column are illustrated in FIG. 5 for the sake of convenience of the description, two output lines can likewise be provided for each column in practice. The respective output lines are connected to the circuits of pixels of the columns in every other row.

The selection unit 112 has switches which connect the output lines of the pixel array unit 111 to an input of the ADC 113, and is controlled by the control unit 101 to control a connection of the pixel array unit 111 and the ADC 113. In other words, pixel signals read from the pixel array unit 111 are supplied to the ADC 113 via the selection unit 112.

The selection unit 112 has a switch 131, a switch 132, and a switch 133. The switch 131 (a selection SW) controls a connection of two output lines corresponding to the same column. For example, when the switch 131 is in an on-state (ON), the first output line (VSL1) and the second output line (VSL2) are connected to each other, and when the switch is in an off-state (OFF), the lines are disconnected.

Although details will be described below, the image sensor 100 is provided with one ADC (a column ADC) for each output line. Thus, when both the switch 132 and the switch 133 are assumed to be in the on-state, if the switch 131 is in the on-state, two output lines of the same column are connected, and thus the circuit of one pixel is connected to two ADCs. Conversely, if the switch 131 is in the off-state, the two output lines of the same column are disconnected, and thus the circuit of one pixel is connected to one ADC. That is, the switch 131 selects the number of ADCs (column ADCs) serving as output destinations of signals of one pixel.

Although details will be described below, as the switch 131 controls the number of ADCs serving as output destinations of pixel signals as described above, the image sensor 100 can output pixel signals more variously according to the number of ADCs. In other words, the image sensor 100 can realize an output of data in more diverse manners.

The switch 132 controls a connection of the first output line (VSL1) corresponding to the pixel 121 and the ADC corresponding to the output line. When the switch 132 is in the on-state (ON), the first output line and an input of one of comparators of the corresponding ADC are connected to each other. In addition, when it is in the off-state (OFF), they are disconnected.

The switch 133 controls a connection of the second output line (VSL2) corresponding to the pixel 122 and the ADC corresponding to the output line. When the switch 133 is in the on-state (ON), the second output line and an input of one of the comparators of the corresponding ADC are connected to each other. In addition, when it is in the off-state (OFF), they are disconnected.

According to control of the control unit 101, the selection unit 112 switches states of the switches 131 to 133 as described above, and thus the number of ADCs (column ADCs) serving as output destinations of signals of one pixel can be controlled.

Note that (one or both of) the switch 132 and the switch 133 may be omitted, and thus each output line and the ADC corresponding to the output line may be set to be connected to each other at all times. However, as these switches control a connection and disconnection of the elements, a range of selection of the number of ADCs (column ADCs) serving as output destinations of signals of one pixel is widened. In other words, by providing these switches, the image sensor 100 can output pixel signals in more diverse manners.

Note that, although only the configuration with respect to the output lines for one column has been introduced in FIG. 5, the selection unit 112 has a configuration similar to that which is illustrated in FIG. 5 (the switch 131 to the switch 133) for each column in practice. That is, the selection unit 112 is controlled to perform connection in a similar way as described above for each column according to control of the control unit 101.

The ADC 113 performs an A-D conversion on each pixel signal supplied from the pixel array unit 111 via each output line, and outputs the signals as digital data. The ADC 113 has ADCs for each of the output lines from the pixel array unit 111 (column ADCs). That is, the ADC 113 has a plurality of column ADCs. A column ADC corresponding to one output line is a single slope type ADC having a comparator, a D-A converter (DAC), and a counter.

The comparator compares an output of its DAC and a signal value of a pixel signal. The counter increments a count value (a digital value) until the pixel signal becomes equal to the output of the DAC. When the output of the DAC reaches the signal value, the comparator stops the counter. Thereafter, signals digitalized by counters 1 and 2 are output to the outside of the image sensor 100 from DATA1 and DATA2.

After outputting data for a next A-D conversion, the counter sets the count value to return to its initial value (for example, 0).

The ADC 113 has the column ADCs in two series for each column. For example, a comparator 141 (COMP1), a DAC 142 (DAC1), and a counter 143 (the counter 1) are provided for the first output line (VSL1), and a comparator 151 (COMP2), a DAC 152 (DAC2), and a counter 153 (the counter 2) are provided for the second output line (VSL2). Although not illustrated, the ADC 113 has a similar configuration for output lines of other columns.

However, a DAC included in such a configuration can be shared. The DAC is shared for each series. That is, the DAC of the same series is shared by columns. In the example of FIG. 5, the DAC corresponding to the first output line (VSL1) of each column is shared as the DAC 142, and the DAC corresponding to the second output line (VSL2) of each column is shared as the DAC 152. Note that the comparators and counters are provided for each series of the output lines.

The constant current circuit unit 114 is a constant current circuit connected to each output line, and is controlled to be driven by the control unit 101. A circuit of the constant current circuit unit 114 is configured with, for example, a metal-oxide semiconductor (MOS) transistor, and the like. Although the circuit configuration is arbitrary, an MOS transistor 161 (LOAD1) is provided for the first output line (VSL1), and an MOS transistor 162 (LOAD2) is provided for the second output line (VSL2) in FIG. 5 for the sake of convenience of the description.

The control unit 101 receives a request from, for example, the outside, such as a user, and selects a reading mode, and controls the selection unit 112 to control connection to an output line. In addition, the control unit 101 controls driving of a column ADC according to the selected reading mode. Furthermore, the control unit 101 controls driving of the constant current circuit unit 114, or controls driving of the pixel array unit 111 for, for example, a reading rate, a reading timing, or the like in addition to the column ADC when necessary.

Consequently, the control unit 101 can not only control the selection unit 112 but can also cause each unit other than the selection unit 112 to operate in more diverse modes. Therefore, the image sensor 100 can output pixel signals in more diverse manners.

Note that the number of units illustrated in FIG. 5 can be arbitrary as long as it is not insufficient. For example, three or more series of output lines may be provided for each column. In addition, by increasing the number of pixel signals output in parallel from the ADC 132 or the number of ADCs 132, the number of pixel signals output in parallel to the outside may be increased.

Next, a configuration of chips of the image sensor 100 according to the present embodiment will be described with reference to FIG. 6. As described with reference to FIG. 5, if a plurality of ADCs are provided for each column, a size of the chips may increase, and costs may increase accordingly. Thus, in the image sensor 100 according to the present embodiment, the chips may be stacked as illustrated in FIG. 6.

Figure 6:
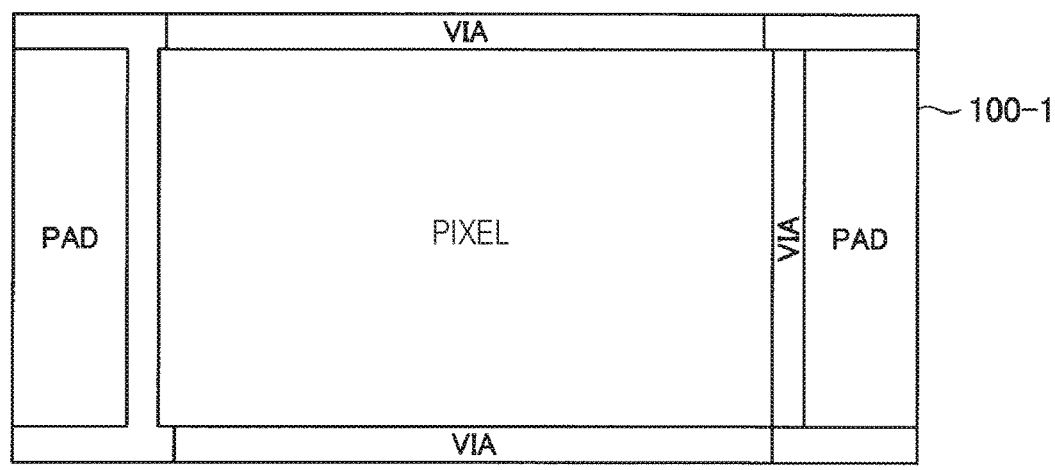
FIG. 6 is an illustrative diagram for describing an example of a configuration of a chip of the image sensor according to the embodiment.
Figure 6:
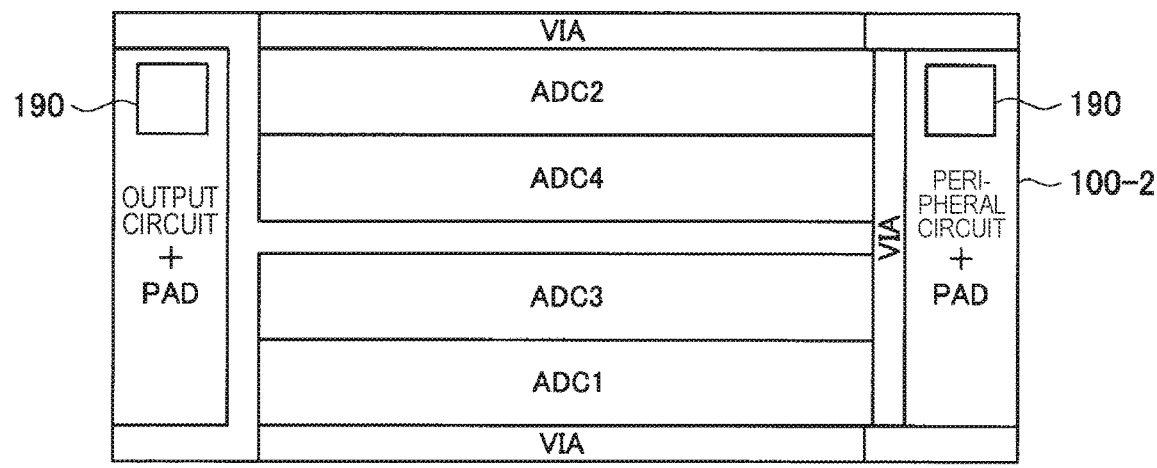

In FIG. 6, the image sensor 100 is constituted by a plurality of chips including a pixel chip 100-1 with which the pixel array unit 111 is mainly formed, a peripheral circuit chip 100-2 in which an output circuit, a peripheral circuit, the ADC 113, and the like are formed, and pads (PADs). Output lines and drive lines of the pixel array unit 111 of the pixel chip 100-1 are connected to a circuit of the peripheral circuit chip 100-2 via through-vias (VIAs). Note that the frame memory 190 illustrated in FIG. 4 may be provided in, for example, the output circuit or the peripheral circuit.

By adopting the configuration described above, the size of the chips can be reduced and costs can be reduced. In addition, since the space for wiring layers is sufficient, drawing wires is eased as a result. Furthermore, by employing a plurality of chips, each of the chips can be optimized. For example, with regard to the pixel chip, a low profile can be realized with a smaller wiring layer to prevent a decrease in quantum efficiency resulting from optical reflection of the wiring layer, and with regard to the peripheral circuit chip, a multilayered wiring layer can be realized to enable optimization such as a measure of inter-wire coupling. For example, the wiring layer of the peripheral circuit chip can be set to have more multilayers than the wiring layer of the pixel chip.

Note that, in cases of a backside illumination image sensor, optical reflection caused on a wiring layer does not occur, but by suppressing an increase in the number of unnecessary wiring layers, an increase in the number of wiring steps or the like can be suppressed, and a reduction in costs can be realized.

In addition, since an area of the chips is equal to an area of pixel chips, a plurality of ADCs can be mounted in the region of the peripheral circuit without increasing a total area of the stacked chips.

Note that it is needless to say that the image sensor (or the imaging device) to which the present technology is applied is not limited to the above-described configuration, and may adopt other configurations.

As described above, the image sensor 100 according to the present embodiment photoelectrically converts light incident via the optical system elements, which are not illustrated, generates pixel signals by performing an A-D conversion on pixel values of respective pixels, and outputs each of the generated pixel signals from DATA1 and DATA2 illustrated in FIG. 5. In addition, the image sensor 100 splits the pixel signals output from either of, for example, DATA1 and DATA2 (DATA1 is assumed here) using a splitter or the like, and outputs the one split group of the pixel signals to the image processing LSI 200 as the stream n1 illustrated in FIG. 3.

In addition, the image sensor 100 temporarily records the other group of the pixel signals split using the splitter or the like and output from the DATA1 in the frame memory 190 along with the pixel signals output from the DATA2. Then, the image sensor 100 sequentially reads the pixel signals of pixels recorded in the frame memory 190 and outputs image signals based on the read pixel signals to the image processing LSI 200 as the stream n2. Note that a main entity which controls an input and output of the pixel signals to and from the frame memory 190 is not particularly limited. The control unit 101 described above, for example, may execute the control, or another control unit different from the control unit 101 may be provided.

Furthermore, a location at which the frame memory 190 is provided or the number of frame memories 190 is not particularly limited as long as pixel signals acquired from the pixels constituting the pixel array unit 111 can be temporarily held. By providing a plurality of frame memories 190, for example, an input and output of pixel signals to and from each of the plurality of frame memories 190 can be executed in parallel. Thus, a decrease in a processing speed attributable to a speed necessary for the input and output of pixel signals to and from the frame memories 190 can be alleviated.

In addition, as another example, a cache for temporarily holding pixel signals acquired from the pixels may be provided on the pixel circuits of the pixels constituting the pixel array unit 111. With this configuration, execution timings of a process related to an input and output of pixel signals performed between the pixels and the frame memory 190 or a process related to reading of pixel signals from the frame memory 190 can be more flexibly controlled. Furthermore, since the number of pins for writing pixel signals into the frame memory 190 from each pixel circuit increases, a band of a bus between the pixel circuit and the frame memory 190 can also be widened more.

[1.4. Configuration of Imaging Device]

Next, an example of a configuration of the imaging device according to the present embodiment will be described with reference to FIG. 7. FIG. 7 is a block diagram illustrating the example of the configuration of the imaging device according to the present embodiment and shows an example in which the above-described image sensor 100 and image processing LSI 200 are provided in the same housing. The imaging device 300 illustrated in FIG. 7 is a device which images subjects and outputs images of the subjects as electric signals.

The imaging device 300 illustrated in FIG. 7 has a lens unit 311, a CMOS sensor 312, an operating unit 314, a control unit 315, an image processing unit 316, a display unit 317, a codec processing unit 318, and a recording unit 319.

The lens unit 311 is constituted by optical system elements such as a lens and a diaphragm. The lens unit 311 is controlled by the control unit 315 to adjust focus on a subject, to collect light traveling from a focused position, and to supply the light to the CMOS sensor 312.

The CMOS sensor 312 is an image sensor for imaging a subject and is controlled by the control unit 315 to perform a photoelectric conversion on incident light and to perform an A-D conversion on pixel values of pixels, and thereby to obtain data of a subject-captured image (a captured image). The CMOS sensor 312 is controlled by the control unit 315 to supply the data of the captured image obtained from the imaging to the image processing unit 316.

The operating unit 314 is configured with, for example, a jog dial (registered trademark), keys, buttons, a touch panel, or the like, and receives input of operations from a user, and then supplies signals corresponding to the input of the operations to the control unit 315.

The control unit 315 controls driving of the lens unit 311, the CMOS sensor 312, the image processing unit 316, the display unit 317, the codec processing unit 318, and the recording unit 319 based on signals corresponding to an input of operations of a user through the operating unit 314 to cause each of the units to perform processes related to imaging.

The image processing unit 316 performs various kinds of image processing, for example, black level correction, color mixture correction, defect correction, demosaic processing, matrix processing, gamma correction, YC conversion, and the like on image signals supplied from the CMOS sensor 312. Content of the image processing is arbitrary, and processing other than those described above may be performed. The image processing unit 316 supplies signals of the processed image to the display unit 317 and the codec processing unit 318.

The display unit 317 is configured as, for example, a liquid crystal display, or the like, and displays an image of the subject based on the image signals from the image processing unit 316.

The codec processing unit 318 performs an encoding process of a predetermined scheme on the image signals from the image processing unit 316, and supplies image data obtained as a result of the encoding process to the recording unit 319.

The recording unit 319 records the image data from the codec processing unit 318. The image data recorded on the recording unit 319 is read by the image processing unit 316 to be supplied to the display unit 317 when necessary, and then an image corresponding thereto is displayed.

The CMOS sensor 312 of the imaging device 300 has a configuration similar to the image sensor 100 described above with reference to FIG. 5.

Namely, the CMOS sensor 312 has a selection unit (a switch) for selecting the number of ADCs (column ADCs) serving as output destinations of a signal of one pixel. That is, the CMOS sensor 312 can output pixel signals in more diverse manners according to the number of ADCs. Thus, the imaging device 300 can realize more diverse processes using these various pixel signals.

In addition, the CMOS sensor 312 includes the frame memory 190 and causes pixel signals from all pixels to be temporarily held in the frame memory 190, and thereby can output a low resolution image and a high resolution image as different streams n1 and n2. Furthermore, the image processing unit 316 corresponds to the image processing unit 210 of the image processing LSI 200 described above with reference to FIG. 4. Thus, the image processing unit 316 can cause, for example, image signals output first from the CMOS sensor 312 (the low resolution image) to be displayed on the display unit as a preview image, and record the image signals output next (the high resolution image) as image data. In other words, even when a speed of a transfer between the COMS sensor 312 and the image processing unit 316 is limited, the imaging device 300 can further shorten a time taken from the completion of the exposure to the display of the preview image.

In addition, as another example, the image processing unit 316 can also analyze the image signals output first from the COMS sensor 312 (the low resolution image), and perform image processing on the image signals output next (the high resolution image) based on the result of the analysis. That is, the imaging device 300 can shorten a time taken from the completion of the exposure to the analysis of the captured image, the image processing on the captured image based on the result of the analysis, and the output of the processed image.

Furthermore, with the above-described configuration, the image processing unit 316 can use a result of analysis with regard to a low resolution image corresponding to the same frame as an image output first in image processing on a high resolution image. Thus, the imaging device 300 can further improve accuracy of image processing in comparison to when image processing is executed based on a result of analysis of an image captured in a different frame.

<2. Example>

Next, as examples of the imaging device according to the present embodiment, examples of modes in which the imaging device captures an image of a subject, and an example of a flow of a process in each mode, i.e., processes from exposure (imaging) of an image of a subject to reading of image signals indicating the exposed image, will be described.

[2.1. Example 1: Example in which Images with Different Resolutions are Output in Time Series Manner]

First, an example of a flow of a process of the imaging device according to example 1 will be described with reference to FIG. 8 together with the example of the schematic configuration illustrated in FIG. 4. FIG. 8 is a schematic time chart for describing the example of the flow of the process of the imaging device according to example 1.

FIG. 8 illustrates a relation between pixel control representing an exposure process of pixels, memory control representing a process related to input and output of pixel signals to and from the frame memory 190, and output control representing a process related to a transfer of pixel signals from the image sensor 100 to the image processing LSI 200. In FIG. 8, the horizontal axis represents time. In addition, the vertical axis of the time chart indicating the pixel control, the memory control, and the output control represents positions of pixels serving as output sources of target pixel signals in a row direction.

Reference numerals T11 and T12 indicate examples of vertical synchronizing signals of the image sensor 100 according to the present embodiment as frame rates. For example, T11 is about 30 [fps], and T12 is about 120 [fps]. Note that the period T11 indicates a time taken to complete exposure of a series of pixels, and the period T12 corresponds to a scanning period necessary for scanning a series of pixels as illustrated in FIG. 8.

In addition, reference numerals d110 to d114 schematically indicate exposure periods of pixels of the pixel array unit 111. That is, each of the exposure periods d110 to d114 schematically indicates a flow of a process of exposure at each of pixels of the pixel array unit 111 while shifting start timings in units of rows in a time-series manner. In addition, reference numeral T13 indicates an exposure time of each pixel.

Reference numerals d210 to d213 indicate a flow of processes of the image sensor 100 writing pixel signals output from pixels in the frame memory 190 (temporary holding processes) during the exposure periods d110 to d113. Note that the processes of the writing the pixel signals into the frame memory 190 indicated by the reference numerals d210 to d213 may be simply described as a "writing process" below.

In addition, reference numerals d310 to d313 indicate a flow of processes of the image sensor 100 outputting pixel signals from at least some pixels among the plurality of pixels constituting the pixel array unit 111 to the image processing LSI 200 as the stream n1 illustrated in FIG. 4. Note that the output processes of the image signals from the image sensor 100 to the image processing LSI 200 indicated by the reference numerals d310 to d313 may be referred to as "first output processes" below.

In addition, reference numerals d221 to d223 indicate a flow of processes of the image sensor 100 reading pixel signals written (temporarily held) in the frame memory 190. Note that the processes related to reading of the image signals from the image sensor 100 indicated by the reference numerals d221 to d223 may be simply referred to as "reading processes" below.

Furthermore, reference numerals d321 to d323 indicate a flow of processes of the image sensor 100 outputting pixel signals read from the frame memory 190 to the image processing LSI 200 as the stream n2 illustrated in FIG. 4. Note that the processes of outputting the pixel signals read from the frame memory 190 to the image processing LSI 200 from the image sensor 100 indicated by the reference numeral d321 to d323 may be referred to as "second output processes" below.

As illustrated in FIG. 8, the writing process d211 and the first output process d311 are executed in synchronization with an end of the exposure period d111. That is, when exposure at each pixel of the pixel array unit 111 is completed (i.e., when the exposure period d111 ends), the image sensor 100 sequentially writes pixel signals output from the pixels in the frame memory 190 at the processing timing indicated by the writing process d211. In addition, with regard to pixel signals from some pixels, the image sensor 100 splits the pixel signals output toward the frame memory 190, and outputs some of the pixel signals directly to the image processing LSI 200 at the processing timing indicated by the first output process d310. In addition, with regard to the other split pixel signals, the image sensor 100 writes the pixel signals in the frame memory 190. This is applied similarly to pixel signals output from pixels after ends of the other exposure periods indicated by d110 and d112 to d114.

In addition, after the completion of the first output process d311, the image sensor 100 sequentially reads pixel signals written in the frame memory 190 in the writing process d211 (for example, the pixel signals from all of the pixels) at the processing timing indicated by the reading process d221. Then, the image sensor 100 outputs the pixel signals read from the frame memory 190 to the image processing LSI 200 at the processing timing indicated by the second output process d321. This is applied similarly to pixel signals written in the frame memory 190 in the other writing processes indicated by d212 and d213 (i.e., pixel signals output after the ends of the exposure periods d112 and d113).

Based on the above configuration, the image sensor 100 outputs image signals based on the pixel signals from some of the pixels (a low resolution image) and image signals based on the image signals from all of the pixels (a high resolution image) to the image processing LSI 200 as the first output process d311 and the second output process d321 in a time division manner. Thus, the image processing LSI 200 can, for example, cause image signals output first based on the first output process d311 (the low resolution image) to be displayed on the display unit as a preview image, and record image signals output next based on the second output process d321 (the high resolution image) as image data. Consequently, even when a speed of a transfer between the image sensor 100 and the image processing LSI 200 is limited, the imaging device according to the present example can further shorten a time taken from the completion of the exposure to the display of the preview image.

In addition, the image processing LSI 200 can analyze the image signals output first based on the first output process d311 (the low resolution image), and based on the result of the analysis, can perform image processing on the image signals output next based on the second output process d321 (the high resolution image). Consequently, the imaging device according to the present example can further shorten a time taken from the completion of the exposure to the analysis of the captured image, the image processing on the captured image based on the result of the analysis, and the output of the processed image.

Note that, although the example in which the first output processes d310 to d323 are executed based on the pixel signals acquired in the exposure periods d110 to d113 has been described above, the first output process may not be executed on pixel signals acquired in a specific exposure period. For example, in the example illustrated in FIG. 8, the first output process d311 may not be executed. In this case, with regard to the pixel signals captured in the exposure period d111, only the signals of the high resolution image are output to the image processing LSI 200 based on the second output process d321.

Likewise, the second output process may not be executed for pixel signals acquired in a specific exposure period. For example, in the example illustrated in FIG. 8, with regard to the pixel signals captured in the exposure period d110, only the signals of the low resolution image are output to the image processing LSI 200 based on the first output process d310.

In addition, when only the low resolution image is output to the image processing LSI 200 based on the first output process, the image sensor 100 may not necessarily execute a writing process, i.e., a process related to writing pixel signals to the frame memory 190.

[2.2. Example 2: Example in which Images with Different Resolutions are Output in Parallel]

Next, an example of a flow of a process of the imaging device according to example 2 will be described with reference to FIG. 9 together with the example of the schematic configuration illustrated in FIG. 4. FIG. 9 is a schematic time chart for describing the example of the flow of the process of the imaging device according to example 2.

The horizontal axis and the vertical axis of FIG. 9 represent the same values as those in comparative example 1 described with reference to FIG. 8. In addition, reference numerals T11, T12, d110 to d114, d210 to d213, and d310 to d313 of FIG. 9 are the same things as those of example 1 described with reference to FIG. 8.

In addition, reference numerals d231 and d233 indicate a flow of processes of the image sensor 100 reading pixel signals written (temporarily held) in the frame memory 190 (i.e., reading processes) in the imaging device according to the example 2.

Furthermore, reference numerals d331 and d333 indicate a flow of processes of the image sensor 100 outputting pixel signals read from the frame memory 190 to the image processing LSI 200 as the stream n2 illustrated in FIG. 4 (i.e., second output processes) in the imaging device according to example 2.

As can be understood from a comparison of the reading process d231 of FIG. 9 and the reading process d221 of FIG. 8, the image sensor 100 according to the present example performs the reading process (i.e., a process of reading pixel signals from the frame memory 190) at a speed different from that of example 1 illustrated in FIG. 8. This is applied similarly to the second output process. That is, the image sensor 100 according to the present example performs the second output process (i.e. a process of outputting pixel signals read from the frame memory 190 to the image processing LSI 200) at a speed different from that of example 1 illustrated in FIG. 8.

Specifically, the image sensor 100 according to the present example reads pixel signals for one image from the frame memory 190 through a period in which two images are captured (double the period T11), and outputs the image signals based on the read pixel signal to the image processing LSI 200. In other words, the image sensor 100 according to the present example executes the reading process and the second output process at a lower speed than in example 1 illustrated in FIG. 8.

In addition, as can be understood from a comparison between the writing process d211 and the reading process d231 in FIG. 9, the image sensor 100 according to the present example sequentially reads the pixel signals written in the frame memory 190 without waiting for the completion of a series of the writing processes. Then, the image sensor 100 executes the second output process d331 in parallel with the first output process d311. That is, the image sensor 100 according to the present example outputs the image signals based on the pixel signals read from the frame memory 190 to the image processing LSI 20 in parallel with the image signals output to the image processing LSI 200 based on the first output process d311.

With this configuration, even when a speed of a transfer between the image sensor 100 and the image processing LSI 200 is limited, the image sensor 100 can output signals of a low resolution image and a high resolution image to the image processing LSI 200 in parallel. In addition, at this time, the image signals output based on the first output process d311 (the low resolution image signals) are received by the image processing LSI 200 before the image signals output based on the second output process d331 (the high resolution image signals).

Thus, the image processing LSI 200 can cause the image signals output first based on the first output process d311 (a low resolution image) to be displayed on the display unit as a preview image, and record the image signals output next based on the second output process d331 (a high resolution image) as image data. Note that, by lowering the speed of the second output process at this time, the image sensor 100 can output the high resolution image signals to the image processing LSI 200 via a bus in which a band is limited. With this configuration, even when a speed of a transfer between the image sensor 100 and the image processing LSI 200 is limited, the imaging device according to the present example can further shorten a time taken from the completion of the exposure to the display of the preview image.

In addition, the image processing LSI 200 can analyze the image signals output first based on the first output process d311 (the low resolution image), and based on the result of the analysis, can perform image processing on the image signals output next based on the second output process d331 (the high resolution image). Consequently, the imaging device according to the present example can shorten a time taken from the completion of the exposure to the analysis of the captured image, the image processing on the captured image based on the result of the analysis, and then the output of the processed image.

[2.3. Example 3: Example in which Consecutive Photographing is Performed]

Next, as example 3, an example of a flow of a process of the imaging device according to the present embodiment when consecutive photographing is performed will be described with reference to FIG. 10 together with the example of the schematic configuration illustrated in FIG. 4. FIG. 10 is a schematic time chart for describing the example of the flow of the process of the imaging device according to example 3.

In FIG. 10, the horizontal axis and the vertical axis represent the same values as those in comparative example 1 described with reference to FIG. 8. Likewise, in FIG. 10, reference numerals T11 and T12 indicate the same things as those in comparative example 1 described with reference to FIG. 8.

In addition, in FIG. 10, reference numeral d130 indicates a process for resetting pixel signals accumulated in each pixel of the pixel array unit 111. Furthermore, reference numeral d141 to d147 schematically indicate exposure periods of the pixels of the pixel array unit 111.

In addition, reference numerals d241 to d247 indicate a flow of processes of the image sensor 100 writing the pixel signals output from the pixels in the frame memory 190 in each of the exposure periods d141 to d147, i.e., writing processes.

In addition, reference numerals d341 to d347 indicate a flow of processes of the image sensor 100 outputting pixel signals from at least some of the pixels among the plurality of pixels constituting the pixel array unit 111 to the image processing LSI 200, i.e., first output processes.

In addition, reference numerals d251 and d252 indicate a flow of processes of the image sensor 100 reading pixel signals written (temporarily held) in the frame memory 190, i.e., reading processes.

In addition, reference numerals d351 and d352 indicate a flow of processes of the image sensor 100 outputting pixel signals read from the frame memory 190 to the image processing LSI 200, i.e., second output processes.

In the example illustrated in FIG. 10, the image sensor 100 sequentially writes pixel signals acquired in each of the exposure periods d141 to d147 in the frame memory 190 based on the writing processes d241 to d247. In addition, the image sensor 100 executes the first output processes d341 to d347 in synchronization with the writing processes d241 to d247.

Note that, at this time, it is not necessary for the image sensor 100 to execute the first output processes for all of the pixel signals acquired in each of the exposure periods d141 to d147. As indicated in the first output processes d341 and d347 in FIG. 10, for example, the image sensor 100 may execute the first output processes only for some of the pixel signals among the pixel signals acquired in each of the exposure periods d141 to d147.

After the completion of the writing of the pixel signals acquired in the series of exposure periods d141 to d147 (i.e., a period of consecutive photographing) in the frame memory 190, the image sensor 100 sequentially reads the pixel signals from the frame memory 190 at processing timings indicated by reading processes d251 and d252. Then, the image sensor 100 outputs the pixel signals read from the frame memory 190 to the image processing LSI 200 at processing timings indicated by the second output processes d351 and d352.

With the above-described configuration, the image processing LSI 200 can acquire low resolution image signals based on the first output process d341 before high resolution image signals output based on the second output process d351. Thus, even when a speed of a transfer between the image sensor 100 and the image processing LSI 200 is limited, the imaging device according to the present example can likewise further shorten a time taken from the completion of the exposure to the display of the preview image.

In addition, the image processing LSI 200 can analyze the image signals output first based on the first output process d341 (the low resolution image), and based on the result of the analysis, can perform image processing on the image signal output next based on the second output process d351 (the high resolution image). Consequently, the imaging device according to the present example can likewise shorten the time taken from the completion of the exposure to the analysis of the captured image, the image processing on the captured image based on the result of the analysis, and the output of the processed image.

Note that, in the example illustrated in FIG. 10, a maximum number of images that the imaging device according to the present example can consecutively photograph is decided according to a capacity necessary for recording pixel signals for one image and a capacity of frame memory 190.

On the other hand, in the example illustrated in FIG. 10, the image sensor 100 executes the reading processes after the completion of the writing processes of the pixel signals acquired in the series of exposure periods d141 to d147 (i.e., the period of consecutive photographing) in the frame memory 190. However, with regard to the pixel signals acquired in the exposure period d141, for example, a timing at which the reading process d251 is started is not particularly limited as long as the timing is later than the writing process d241. Thus, the image sensor 100 may start reading (i.e., the reading processes) of the pixel signals written in the frame memory 190 without waiting for the completion of the writing processes of the pixel signals acquired in the series of exposure periods.

FIG. 11 illustrates an example in which the image sensor 100, for example, starts the reading (i.e., the reading processes) of the pixel signals written in the frame memory 190 without waiting for the completion of the writing processes of the pixel signals acquired in the series of exposure periods. The example illustrated in FIG. 11 shows start timings of the reading processes d251 to d257 and the second output processes d351 to d357 different from those in the example described based on FIG. 10.

In the example illustrated in FIG. 11, for example, the image sensor 100 starts the reading process d251 without waiting for the completion of a series of writing processes when pixel signals from pixels are written in the frame memory 190 based on the writing process d241. Then, the image sensor 100 executes the second output process d351 in synchronization with the reading process d251.

With the configuration described above, the pixel signals written in the frame memory 190 based on the writing processes d241 and d242 have already been read from the frame memory 190 based on the reading processes d251 and d252 at the timing indicated by reference numeral t21. In other words, from the timing t21 in the example illustrated in FIG. 11, the image sensor 100 can secure a region in the frame memory 190 again after the pixel signals are read based on the reading processes d251 and d252, and can reuse the secured region.

Thus, in the example illustrated in FIG. 11, by reusing the region in the frame memory 190 secured again from the timing t21, for example, the image sensor 100 can capture additional images in exposure periods d148 and d149. Note that the image sensor 100 at this time may write pixel signals acquired in the exposure periods d148 and d149 in the region in the frame memory 190 secured again based on writing processes d248 and d249.

Of course, the image sensor 100 may output low resolution image signals to the image processing LSI 200 by executing first output processes based on the pixel signals acquired in the exposure periods d148 and d149. In addition, the image sensor 100 may read the pixel signals written in the frame memory 190 based on the writing processes d248 and d249 based on reading processes d258 and d259, and output the pixel signals to the image processing LSI 200 based on second output processes d358 and d359.

As described above, in the example illustrated in FIG. 11, by controlling processing timings of the writing processes, the reading processes, and the second output processes according to the capacity of the frame memory 190, the maximum number of consecutively photographable images can be further improved in comparison to the example illustrated in FIG. 10.

Note that, although the example of consecutive photographing has been described above, it is needless to say that the technology according to the present example can be applied to, for example, so-called bracketing photography in which a plurality of images are consecutively captured under changed photographic conditions.

Examples of the imaging device according to the present embodiment have been described with reference to FIGS. 8 to 11 above. Note that it is needless to say that the content described as each example above is merely an example, and a mode of the imaging device according to the present embodiment and embodiments are not limited to the content described above. That is, the image sensor 100 of the imaging device according to the present embodiment has the frame memory, outputs one piece of data having a different density (image signals having a different resolution) directly to the image processing LSI 200, and temporarily holds the other piece in the frame memory. Then, the image sensor 100 reads the other piece of data from the frame memory and outputs the data to the image processing LSI 200. As long as the pieces of data having different densities are output as the streams n1 and n2 illustrated in FIG. 4 as described above, a mode of the imaging device according to the present embodiment is not particularly limited.

<3. Hardware Configuration>

The series of processes described above can be executed by hardware or software. When the series of processes are executed by software, a program configuring the software is installed in a computer. Here, the computer may be a computer which is incorporated with dedicated hardware, such as the control unit 315 in FIG. 8, or a general-purpose computer which can execute various functions with various programs installed. Thus, an example of a hardware configuration of the computer will be described below with reference to FIG. 12. FIG. 12 is an illustrative diagram for describing the example of the hardware configuration of the computer.

In FIG. 12, a central processing unit (CPU) 401 of the computer 400 executes various kinds of processes according to a program recorded in a read only memory (ROM) 402 or a program loaded in a random access memory (RAM) 403 from a storage unit 413. The RAM 403 also appropriately stores data and the like necessary for the CPU 401 to execute various kinds of processes.

The CPU 401, the ROM 402, and the RAM 403 are connected to one another via a bus 404. The bus 404 is also connected to an input and output interface 410.

The input and output interface 410 is connected with an input unit 411 including a keyboard, a mouse, and the like, an output unit 412 including a display such as a cathode ray tube (CRT) or a liquid crystal display (LCD), speaker, and the like, the storage unit 413 configured as a hard disk or the like, a communication unit 414 configured as a modem, or the like. The communication unit 414 performs communication processes via a network including the Internet.

The input and output interface 410 is also connected with a drive 415 when necessary, a removable medium 421 such as a magnetic disk, an optical disc, a magneto-optical disc, or a semiconductor memory is appropriately mounted therein, and a computer program read from the medium is installed in the storage unit 413 when necessary.

When the series of processes described above are executed by software, a program configuring the software is installed from a network or a recording medium.

This recording medium is configured, for example, not only as the removable medium 421 including a magnetic disk (including a flexible disk), an optical disc (including a compact disc-read only memory (a CD-ROM) or a digital versatile disc (a DVD)), a magneto-optical disc (including a Mini disc (MD)), or a semiconductor memory distributed separately from a main body of a device to deliver programs to users in which programs are recorded, but also as the ROM 402 in which programs are recorded or a hard disk included in the storage unit 413 delivered to users in a state in which the medium is incorporated into the main body of the device in advance, as illustrated in FIG. 11.

Note that the program executed by the computer may be a program in which processes are carried out in a time series in the order described in this specification or may be a program in which processes are carried out in parallel or at necessary timings, such as when the processes are called.

Note that, in this specification, steps in which the program to be recorded in the recording medium is written do not necessarily have to be performed in time series in line with the order of the steps, and instead may include processing that is performed in parallel or individually.

Further, in this specification, "system" refers to a whole device composed of a plurality of devices.

Further, an element described as a single device (or a processing unit) above may be divided and configured as a plurality of devices (or processing units). On the contrary, elements described as a plurality of devices (or processing units) above may be configured collectively as a single device (or a processing unit). Further, an element other than those described above may be added to each device (or a processing unit). Furthermore, a part of an element of a given device (or a processing unit) may be included in an element of another device (or another processing unit) as long as the configuration or operation of the system as a whole is substantially the same. In other words, an embodiment of the disclosure is not limited to the embodiments described above, and various changes and modifications may be made without departing from the scope of the disclosure.

<4. Conclusion>

As described above, the image sensor according to the present embodiment has the frame memory. In addition, the image sensor according to the present embodiment outputs image signals based on pixel signals from at least some pixels among a plurality of pixels constituting the pixel array unit to the image processing LSI, and temporarily records image signals from the plurality of pixels in the frame memory. Furthermore, the image sensor sequentially reads the pixel signals of the pixels recorded in the frame memory and outputs image signals based on the read pixel signals to the image processing LSI.

With this configuration, the image sensor according to the present embodiment can output, for example, image signals of a low resolution image directly to the image processing LSI from the pixel array unit, and can output image signals of a high resolution image to the image processing LSI separately from the image signals of the low resolution image.

Thus, the image processing LSI can cause the image signals output first from the image sensor (the low resolution image) to be displayed on the display unit as a preview image, and record the image signals output next (the high resolution image) as image data. With this configuration, even when a speed of a transfer between the image sensor and the image processing LSI is limited, the imaging device according to the present embodiment can further shorten a time taken from completion of exposure to display of the preview image.

In addition, as another example, the image processing LSI can also analyze the image signals output first from the image sensor (the low resolution image), and based on the result of the analysis, can perform image processing on the image signals output next (the high resolution image). Thus, the imaging device according to the present embodiment can further shorten a time taken from the completion of the exposure to the analysis of the captured image, the image processing on the captured image based on the result of the analysis, and the output of the processed image.

Furthermore, with the above-described configuration, the image processing LSI can use a result of analysis of a low resolution image corresponding to the same frame as the image output first in image processing performed on a high resolution image. Thus, the imaging device according to the present embodiment can improve accuracy in the image processing more than when the image processing is performed on a result of analysis of an image captured in a different frame.

In addition, as still another example, the image processing LSI may sequentially acquire image signals of low resolution images from the image sensor and generate a dynamic image based on the acquired images. Furthermore, at this time, the image processing LSI may separately acquire image signals of a high resolution image corresponding to a desired frame (for example, a frame that a user designates) and generate a still image based on the acquired image signals.

With this configuration, the imaging device according to the present embodiment can capture both a dynamic image and a still image at the same time, and record an image having a higher resolution than the dynamic image as the still image. In addition, at this time, image signals of a high resolution image only for a desired frame are output from the image sensor. Thus, the imaging device according to the present embodiment can suppress a volume of image signals transferred between the image sensor and the image processing LSI to a minimum level, and further can shorten a time necessary for outputting each image.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing device including:

a processing unit configured to process each piece of first data transferred with a first data density and second data transferred with a second data density that is different from the first data density based on pixel signals output from each of a plurality of pixels;

wherein the processing unit executes at least one of processing of outputting an image based on the first data and image-processing on the second data based on the first data.

(2)

The information processing device according to (1), wherein the processing unit causes an image based on the first data to be displayed on a display unit as a through image, and causes image data based on the second data to be stored in a predetermined storage unit.

(3)

The information processing device according to (1) or (2), wherein the processing unit performs the image processing on the second data based on pixel signals, which are based on the same frame as the pixel signals serving as generation sources of the first data based on the first data.

(4)

The information processing device according to any one of (1) to (3), wherein the processing unit acquires pieces of the second data, which is smaller in number than the first data, during a period in which a plurality of pieces of the first data are acquired.

(5)

The information processing device according to any one of (1) to (4), wherein the processing unit acquires the first data and the second data transferred in parallel with each other.

(6)

The information processing device according to any one of (1) to (4), wherein the processing unit acquires the first data and the second data based on pixel signals based on the same frame as the pixel signals serving as generation sources of the first data in a time division manner.

(7)

The information processing device according to (6), wherein the processing unit acquires the second data based on the pixel signals based on the same frame as the pixel signals serving as the generation sources of the first data after acquiring the first data.

(8)

The information processing device according to any one of (1) to (7), wherein the processing unit acquires a plurality of pieces of the first data indicating images captured under different conditions and the second data indicating at least some images among the images corresponding to the plurality of pieces of first data.

(9)

The information processing device according to any one of (1) to (8), wherein the first data density is lower than the second data density.

(10)

The information processing device according to (9), wherein the processing unit generates a dynamic image based on a plurality of pieces of the first data, and generates a still image having a higher resolution than the dynamic image based on the second data.

(11)

The information processing device according to (10), wherein the processing unit generates the still image based on the second data according to the pixel signals that are based on at least some frames among a plurality of frames forming the dynamic image.

(12)

An information processing device including:

a holding unit configured to hold data based on pixel signals output from each of a plurality of pixels; and an output unit configured to output each piece of first data based on pixel signals output from at least some pixels among the plurality of pixels and second data based on the pixel signals held in the holding unit to a processing unit configured to execute at least one of processes of processing an image based on the first data and processing an image based on the second data which is performed based on the first data.

(13)

The information processing device according to (12), wherein the output unit outputs the second data held in the holding unit at a lower speed than a speed at which the second data based on the pixel signals for one frame is held in the holding unit.

(14)

The information processing device according to (12) or (13), wherein the output unit outputs the first data that is based on pixel signals of at least some frames among a plurality of frames based on the pixel signals of the plurality of frames, and outputs a plurality of pieces of the second data that are based on pixel signals of the plurality of frames held in the holding unit after outputting the first data.

(15)

The information processing device according to (14), wherein, as long as an empty region in which the second data based on the pixel signals of one or more frames can be held exists, the holding unit holds the second data that is based on pixel signals output from each of the plurality of images.

(16)

An information processing method including:

acquiring each piece of first data transferred with a first data density and second data transferred with a second data density that is different from the first data density; and executing at least one of processing of causing a display unit to display an image based on the acquired first data and image-processing on the second data based on the first data.

REFERENCE SIGNS LIST

100 image sensor
101 control unit 111 pixel array unit
112 selection unit
114 constant current circuit unit
121, 122 pixel
131, 132, 133 switch
141, 151 comparator
143, 153 counter
161, 162 MOS transistor
190 frame memory
200 image processing LSI
210 image processing unit
300 imaging device
311 lens unit
312 CMOS sensor
314 operating unit
315 control unit
316 image processing unit
317 display unit
318 codec processing unit
319 recording unit

The invention claimed is:

1. An information processing device comprising:
a processing circuitry configured to
receive first data with a first data density in parallel with second data with a second data density that is different than the first data density, the first data and the second data based on pixel signals output from a plurality of pixels,
process the first data to output an image based on the first data,
perform image processing on the second data based on the first data,
acquire the pixel signals output from the plurality of pixels, and
perform the image processing on the second data based on a subset of the pixel signals, the subset of the pixel signals being associated with the same frame as the pixel signals serving as a generation source of the first data.

2. The information processing device according to claim 1, wherein the processing circuitry is further configured to
control a display unit to display a through image based on the first data, and
control a predetermined storage unit to store image data based on the second data.

3. The information processing device according to claim 1, wherein, to receive the first data with the first data density in parallel with the second data with the second data density that is different than the first data density, the processing circuitry is further configured to
acquire a first plurality of pieces of the first data, and
acquire a second plurality of pieces of the second data during a period in which the first plurality of pieces of the first data are acquired, the second plurality of pieces of the second data being a smaller number than the first plurality of pieces of the first data.

4. The information processing device according to claim 1, wherein the processing circuitry is further configured to acquire the first data and the second data associated with the same frame in a time division manner.

5. The information processing device according to claim 4, wherein the processing circuitry is further configured to acquire the second data after acquiring the first data.

6. The information processing device according to claim 1, wherein the processing circuitry is further configured to acquire a plurality of pieces of the first data that are indicative of images captured under different conditions, and
wherein the second data is indicative of at least some images among the images corresponding to the plurality of pieces of the first data.

7. The information processing device according to claim 1, wherein the first data density is a lower density than the second data density.

8. The information processing device according to claim 7, wherein the processing circuitry is further configured to
generate a dynamic image with a first resolution based on a plurality of pieces of the first data, and
generate a still image having a second resolution based on the second data, the second resolution being higher than the first resolution.

9. The information processing device according to claim 8, wherein, to generate the still image having the second resolution based on the second data, the processing circuitry is further configured to generate the still image according to the pixel signals that are associated with at least some frames among a plurality of frames that form the dynamic image.

10. A system comprising:
a first information processing device including
a memory configured to hold data based on pixel signals output from a plurality of pixels; and
an output circuitry configured to output first data with a first data density in parallel with second data with a second data density that is different than the first data density, the first data and the second data based on the pixel signals output from the plurality of pixels; and
a second information processing device including
a processing circuitry configured to
receive the first data with the first data density in parallel with the second data with the second data density that is different than the first data density,
process the first data to output an image based on the first data,
perform image processing on the second data based on the first data,
acquire the pixel signals output from the plurality of pixels, and
perform the image processing on the second data based on a subset of the pixel signals, the subset of the pixel signals being associated with the same frame as the pixel signals serving as a generation source of the first data.

11. The system according to claim 10, wherein the output circuitry is further configured to output the data held in the memory as the second data, the output of the second data being at a lower speed than a speed at which the data based on the pixel signals for one frame is written into the memory.

12. The system according to claim 10, wherein the output circuitry is further configured to
output the first data, and
output a plurality of pieces of the second data that is based on the data held in the memory after outputting the first data.

13. The system according to claim 12, wherein the memory is further configured to hold the data until a capacity threshold of the memory is reached.

14. An information processing method, the method comprising:
receiving, with a processing circuitry, first data with a first data density in parallel with second data with a second data density that is different than the first data density, the first data and the second data based on pixel signals output from a plurality of pixels;
processing, with the processing circuitry, the first data to output an image based on the first data;
performing, with the processing circuitry, image processing on the second data based on the first data;
acquiring the pixel signals output from the plurality of pixels; and
performing the image processing on the second data based on a subset of the pixel signals, the subset of the pixel signals being associated with the same frame as the pixel signals serving as a generation source of the first data.

* * * * *